(12) United States Patent
O'Sullivan et al.

(10) Patent No.: US 8,510,857 B2
(45) Date of Patent: Aug. 13, 2013

(54) FEDERATION OF EMAIL

(75) Inventors: Patrick O'Sullivan, Dublin (IE); Fred Raguillat, Dunboyne (IE); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/642,053

(22) Filed: Dec. 18, 2009

(65) Prior Publication Data

US 2011/0154506 A1    Jun. 23, 2011

(51) Int. Cl.
*G06F 17/30* (2006.01)
*G06F 15/16* (2006.01)

(52) U.S. Cl.
USPC ............................................ 726/28; 709/206

(58) Field of Classification Search
USPC .................. 726/2, 26; 709/206; 715/752
See application file for complete search history.

(56) References Cited

U.S. PATENT DOCUMENTS

| | | | |
|---|---|---|---|
| 2003/0033372 A1* | 2/2003 | Shimada | 709/206 |
| 2003/0204568 A1* | 10/2003 | Bhargava et al. | 709/206 |
| 2007/0094390 A1* | 4/2007 | Nussey | 709/225 |
| 2009/0174551 A1* | 7/2009 | Quinn et al. | 340/540 |

FOREIGN PATENT DOCUMENTS

JP    2004-355427    * 12/2004

* cited by examiner

*Primary Examiner* — Tae Kim
*Assistant Examiner* — Shu Chun Gao
(74) *Attorney, Agent, or Firm* — Cuenot, Forsythe & Kim, LLC (57) ABSTRACT

A method of federating electronic mail (e-mail). A request can be received from a first user to view at least one e-mail of a second user, the request including at least one identifier corresponding to the second user and a criteria indicating a subject matter of the e-mail. The method further can include verifying whether the first user is authorized to access the e-mail of the second user that satisfies the criteria. Responsive to determining that the first user is authorized to view the e-mail of the second user that satisfies the criteria, the first user can be provided access to view the at least one e-mail that satisfies the criteria.

15 Claims, 4 Drawing Sheets

FEDERATION OF EMAIL

BACKGROUND

The embodiments disclosed within this specification relate to electronic mail (e-mail) systems. Communication via e-mail has become ubiquitous throughout the industrialized world. Indeed, e-mail communications are now commonly replacing communications that, prior to the advent of e-mail communication systems, were predominantly relayed via letters, telephone calls and facsimile transmissions.

There are a variety of methods currently used to access e-mail. One method that is commonly used is for a user to access an e-mail account using an e-mail client instantiated on a processing device, such as a computer or a personal digital assistant. The other method that is oftentimes used is for a user to use a web browser to navigate to particular web site where e-mails are stored, and then log into the web site using a user name and password.

That said, the paradigm for e-mail access tends to be adynamic. Oftentimes, in order to share an e-mail with other users, a user who received the e-mail must forward the e-mail to others with whom that e-mail user desires to share the e-mail. Thus, the user receiving the e-mail must not only take the time to forward the e-mail, but also ensure that the e-mail is forwarded to the proper people. If the user inadvertently types in, or selects, an incorrect e-mail address, the intended recipients of the forwarded e-mail may not receive the e-mail.

BRIEF SUMMARY OF THE INVENTION

The embodiments disclosed within this specification relate to electronic messaging systems. One embodiment of the present invention can include a method of federating electronic mail (e-mail). The method can include receiving a request from a first user to view at least one e-mail of a second user, the request including at least one identifier corresponding to the second user and criteria indicating a subject matter of the e-mail. The method further can include verifying whether the first user is authorized to access the e-mail of the second user that satisfies the criteria. Responsive to determining that the first user is authorized to view the e-mail of the second user that satisfies the criteria, the first user can be provided access to view at least one e-mail that satisfies the criteria.

Another embodiment of the present invention can include a system of that federates e-mail. The system can include a processor that receives a request from a first user to view at least one e-mail of a second user, the request including at least one identifier corresponding to the second user and a criteria indicating a subject matter of the e-mail. The processor also can verify whether the first user is authorized to access the e-mail of the second user that satisfies the criteria. Responsive to determining that the first user is authorized to view the e-mail of the second user that satisfies the criteria, the first user can be provided access to view at least one e-mail that satisfies the criteria.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments disclosed herein relate to a federation of electronic mail (hereinafter "e-mail"). E-mails that are received may be shared among not only the intended recipient, but also other e-mail users who may have an interest in the subject matter of such e-mails. For example, a first user can submit a request to view e-mails of a second user. The request can include at least identifier corresponding to the second user and criteria indicating a subject matter of the e-mail. The criteria can, for instance, indicate a subject identified in the e-mail, content contained in the e-mail (e.g., terms contained in a subject line and/or a body of the e-mail), features of e-mail attachments, certain e-mail senders, certain e-mail recipients, or the like. A verification process can be implemented to determine whether the first user is authorized to access the e-mail of the second user, and whether e-mails received by the second user satisfy the criteria. When the first user is authorized to view the e-mail of the second user, and e-mails are received that satisfy the criteria, access to view such e-mails can be provided to the first user.

Figure 1:
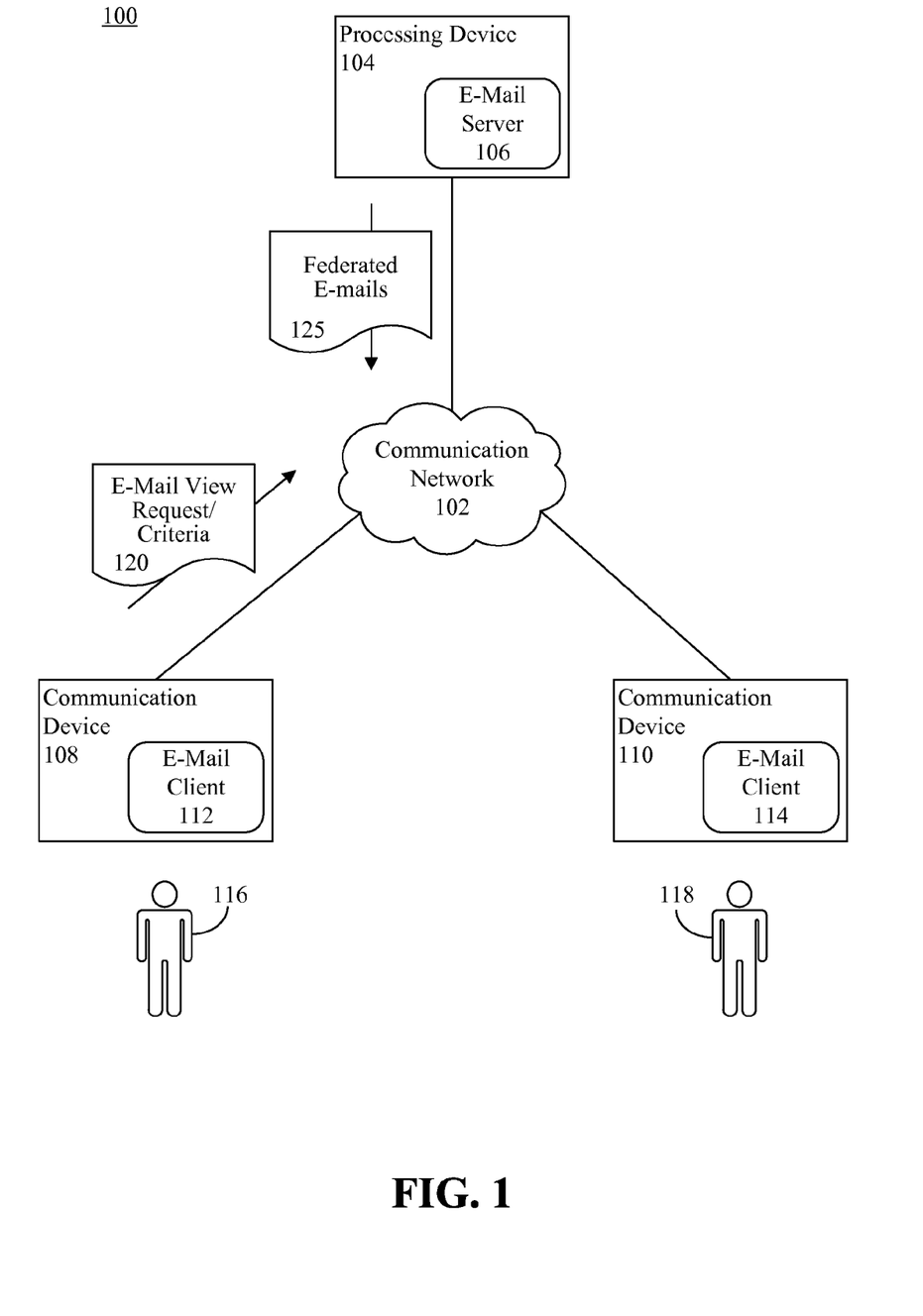
FIG. 1 is a block diagram illustrating a system for federating electronic mail (e-mail) in accordance with one embodiment of the present invention.

FIG. 1 is a first block diagram illustrating a communication system 100 for federating e-mails in accordance with one embodiment of the present invention. The system 100 can include a communication network 102. The communication network 102 can comprise a local area network (LAN), a wide area network (WAN), the Internet, or any other network(s) suitable for communicating electronic data. As such, the communication network 102 can include wired communication links, wireless communication links, fiber optic communication links, or any other communication links suitable for communicating data. As those skilled in the art will appreciate, the communication network 102 can include any of a variety of network servers, routers, switches, access points, base transceiver stations, repeaters, and the like. Moreover, any suitable communication protocols can be implemented in the communication network 102, and the invention is not limited in this regard.

The system 100 also can include a processing device 104 on which an E-mail server 106 is instantiated. The e-mail server 106 can be embodied as an application or other suitable program code. In illustration, the processing device 104 can be a computer dedicated for hosting the e-mail server 106, or a computer that also hosts other applications, for example an application that functions as a domain controller, a file server, etc.

The system 100 also can include one or more communication devices 108, 110. The communication devices 108, 110 can be embodied as computers, mobile computers, netbooks, personal digital assistants, mobile telephones, mobile radios, internet devices, or any other devices on which e-mails communicated via the communication network 102 can be presented for viewing.

In one embodiment, one or both communication devices 108, 110 can include e-mail client applications 112, 114 for managing e-mail communications on the respective communication devices 108, 110. For example, the e-mail clients 112, 114 can receive e-mails, store e-mails, present e-mails for viewing, present user interactive views for generating e-mails, and so on, as is well understood by the skilled artisan. In addition, the e-mail clients 112, 114 can include any of a myriad of menus and toolbars for managing e-mails, and implementing the methods presented herein, which will be described in greater detail.

In another embodiment, one or both communication devices 108, 110 can include a respective web browser via which users can access the e-mail server and/or remotely located e-mail clients. For example, via a web browser instantiated on the communication device 108, a user can access an e-mail client located on another communication device (not shown), or a user can access the e-mail server 106.

In yet another embodiment, one or both communication devices 108, 110 can include a remote desktop which may be used to access another communication device (not shown) on which an e-mail client is instantiated or to access the e-mail server 106. Remote desktops also are well known in the art.

In operation, when it is desired for a first user 116 to access selected e-mails of a second user 118, for example to view such e-mails, an e-mail view request 120 can be generated. The e-mail view request 120 can include at least one identifier corresponding to the second user, and criteria for selecting the e-mail. As noted, the criteria can indicate a subject identified in the e-mail, content contained in the e-mail (e.g., terms contained in a subject line and/or a body of the e-mail), features of e-mail attachments, certain e-mail senders, certain e-mail recipients, or the like. The e-mail senders and/or e-mail recipients can be identified based upon their e-mail addresses, domains from which, or to which, the e-mails are sent, and so on.

Features of e-mail attachments also can be indicated by the criteria. For instance, the criteria can indicate a type of e-mail attachment, content contained in the e-mail attachment, and so on. In one aspect of the present invention, the criteria also can indicate features of diagrams and/or photographs contained in attachments. For instance, image processing techniques known in the art can be applied to such diagrams/ photographs to identify features in the diagrams/ photographs, and the identified features can be compared to the criteria. Still, the criteria can indicate any other features of e-mails and/or attachments, and the invention is not limited in this regard.

In one embodiment, the e-mail view request 120 can be communicated to the e-mail server 106. In another embodiment, the e-mail view request 120 can be communicated to the communication device 110. The e-mail view request 120 also can be sent to any other suitable communication device. The e-mail view request 120 can be communicated from the communication device 108 at the behest of the first user 116, communicated from the communication device 110 at the behest of the second user 118, communicated from the processing device 104 at the behest of an administrator, or communicated by any other authorized person from any suitable device.

When the e-mail view request 120 is received, the e-mail server 106, e-mail client 114, or another suitable application can process the e-mail view request 120 to verify whether the first user 116 is authorized to access the e-mail of the second user that satisfies the criteria contained in the e-mail view request 120. Such verification can be performed in any suitable manner. For example, a user profile associated with the first user 116 can be processed by a suitable device (e.g., a communication device 108, 110, the processing device 104, or another device) in order to determine whether the first user 116 is authorized to view e-mails satisfying the criteria identified by the e-mail view request 120. A user profile associated with the second user 118 also can be processed by in a similar manner to determine whether the first user 116 is authorized to view such e-mails. The respective user profiles can be maintained by the e-mail server 106, a domain controller (not shown), or otherwise made accessible to the appropriate device in a suitable manner.

When the first user 116 is authorized to view e-mails of the second user 118 that meet the specified criteria, e-mails directed to the second user 118 can be processed to determine whether they meet the criteria. Such processing can be performed by the e-mail server 106, the e-mail client 114, or another suitable application when the e-mails are received. In illustration, the subject line and/or the body of the e-mails can be parsed to identify content contained in the e-mail, and a determination can be made whether any such correspond to the criteria. Such content can include textual content, alphanumeric content, symbolic content, and the like.

In another embodiment, the e-mail address of the sender can be identified and a determination can be made whether that e-mail address corresponds to the criteria.

In yet another embodiment, attachments can be processed to determine whether they correspond to the criteria. As noted, such processing can include parsing content in the attachments, performing image recognition on photographs and/or diagrams contained in the attachments to determine whether features contained in the photographs/diagrams correspond to the criteria, and so on. It will be appreciated by those skilled in the art that such attachments can be file attachments, but also may be attachments that are embedded within the e-mail, for example as photographs/images pasted into the body of the e-mail.

When e-mails directed to the second user 118 are received, the e-mails meet the specified criteria, and the first user 116 is authorized to view such e-mails, those e-mails can be made available for viewing by the first user 116. In this regard, the e-mails directed to the second user 118 that are made available for viewing by the first user 116 can be classified as federated e-mails 125. As used herein, the term "federated e-mail" means an e-mail directed to a second user that is automatically accessible for viewing by a first user based on specified criteria related to the e-mail.

In illustration, if the e-mail server 106 is performing the aforementioned processing of the e-mails, the e-mail server 106 can retain the federated e-mails 125 for the first user 116. For example, the federated e-mails 125 can be placed in a directory that the first user is authorized to access. The federated e-mails 125 also can be forwarded to the e-mail client 112, for example when the e-mail client 112 synchronizes with the e-mail server 106. Accordingly, the first user 116 can view the federated e-mails 125 in the e-mail client 112 and/or view the federated e-mails 125 by logging into the e-mail server 106.

In one aspect of the present invention, the federated e-mails 125 can be placed into one or more particular folders. Such folders can be defined by the first user 116, the second user 118 and/or an administrator. For instance, the first user 116 or an administrator can create a folder in the e-mail server 106 and/or the e-mail client 112 in which to place all federated e-mails 125. In another embodiment, the second user 118 or an administrator can create a folder in the e-mail client 114 in which to place all federated e-mails 125. Other federated e-mails for which the first user 116 is provided access also can be placed in the same folder, or a folder can be created for each of the users whose federated e-mails are available to be accessed by the first user 116.

In another embodiment, folders can be created for various subject matters. So, federated e-mails 125 pertaining to a first subject can be placed in a first folder, federated e-mails 125 pertaining to a second subject can be placed in a second folder, and so on. The subjects to which the various federated e-mails 125 pertain can be identified when the e-mails are parsed to identify the content, as previously described.

Further, based on the identified content, identifiers that indicate the subject matter of the federated e-mails 125 can be generated and associated with the federated e-mails. The identifiers can be embedded in the federated e-mails 125 as metadata, placed in the subject line of the federated e-mails 125, or associated with the federated e-mails 125 in any other suitable manner. The identifiers can be used not only to facilitate identification of the subject matter by the first and/or second users 116, 118, but also to facilitate organizing operations performed on the federated e-mails 125. For instance, when a particular project is complete, the identifiers can be used to identify federated e-mails 125 associated with that project for the purpose of archiving or deletion. Notwithstanding this example, the identifiers can be used for any other types of organization performed on the federated e-mails 125.

Figure 2:
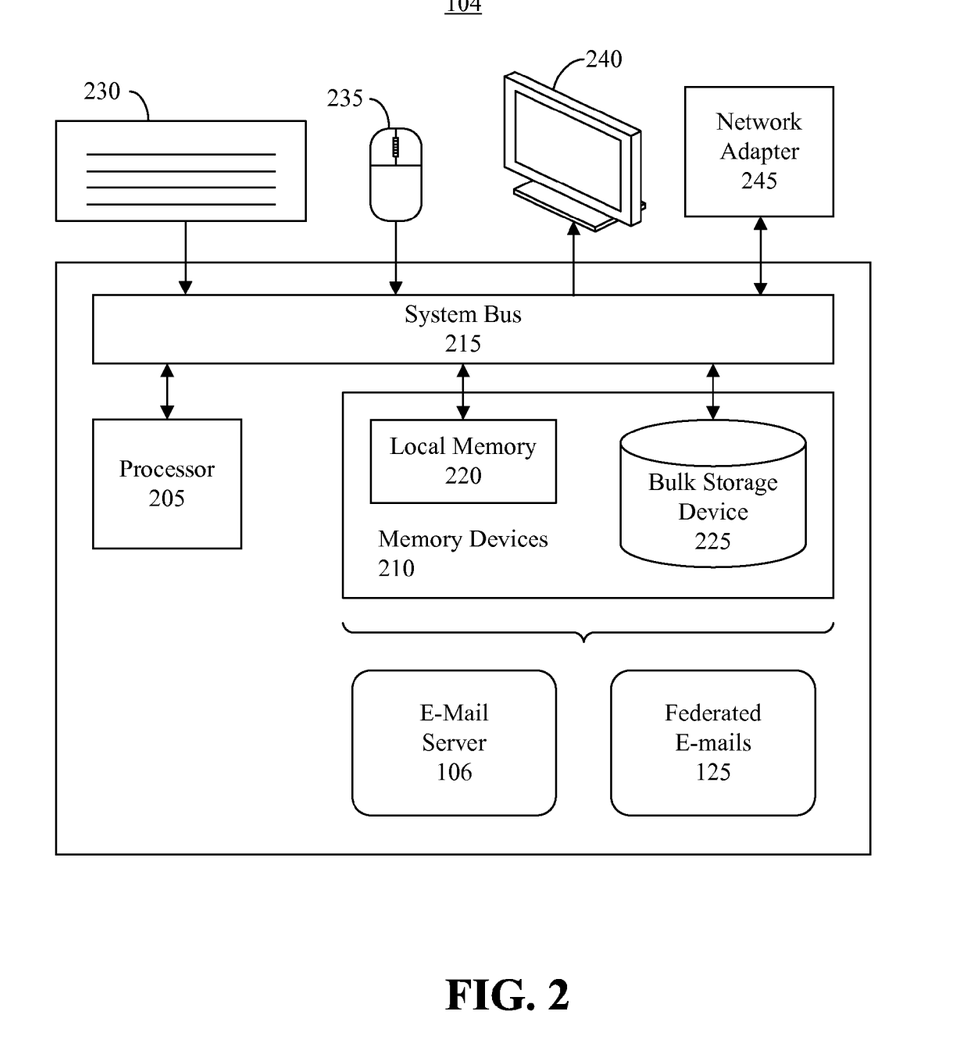
FIG. 2 is a block diagram illustrating a processing device for federating e-mail in accordance with one embodiment of the present invention.

FIG. 2 is a block diagram of a processing device 104 of FIG. 1 that may be used to federate e-mails in accordance with an embodiment of the present invention. The processing device 104 can include at least one processor 205 coupled to memory devices 210 through a system bus 215. As such, the processing device 104 can store program code within the memory devices 210. The processor 205 can execute the program code accessed from the memory devices 210 via system bus 215 in order to implement the processes and methods described herein that are performed by the processing device 104. In one aspect, for example, the processing device 104 can be implemented as computer that is suitable for storing and/or executing program code. It should be appreciated, however, that the processing device 104 can be implemented in the form of any system comprising a processor and memory that is capable of performing the functions described within this specification.

The memory devices 210 can include one or more physical memory devices such as, for example, local memory 220 and one or more bulk storage devices 225. Local memory 220 refers to random access memory or other non-persistent memory device(s) generally used during actual execution of the program code. The bulk storage device(s) 225 can be implemented as a hard drive or other persistent data storage device. The processing device 104 also can include one or more cache memories (not shown) that provide temporary storage of at least some program code in order to reduce the number of times program code must be retrieved from the bulk storage device 225 during execution.

Optionally, input/output (I/O) devices such as keyboard 230, a pointing device 235, and a display 240 also can be coupled to the processing device 104. The I/O devices can be coupled to the processing device 104 either directly or through intervening I/O controllers. A network adapter 245 also can be coupled to processing device 104 to enable the processing device 104 to communicate with the communication devices 108, 110 of FIG. 1, other systems, computer systems, remote printers, and/or remote storage devices through intervening private or public networks. Modems, cable modems, Ethernet cards and transceivers are examples of different types of network adapters that can be used with processing device 104.

As pictured in FIG. 2, the memory devices 210 can store the e-mail server 106. The e-mail server 106, being implemented in the form of executable program code, can be executed by the processing device 104 for the purposes of federating e-mail in accordance with the methods described herein. The memory devices 210 also can store federated e-mails 125. As noted, the federated e-mails 125 can be stored into a particular directory to which the first user is authorized to access. In another embodiment, the federated e-mails 125 can be forwarded to the first user's e-mail client and/or the second user's e-mail client when the e-mail client is synchronized to the e-mail server 106.

Figure 3:
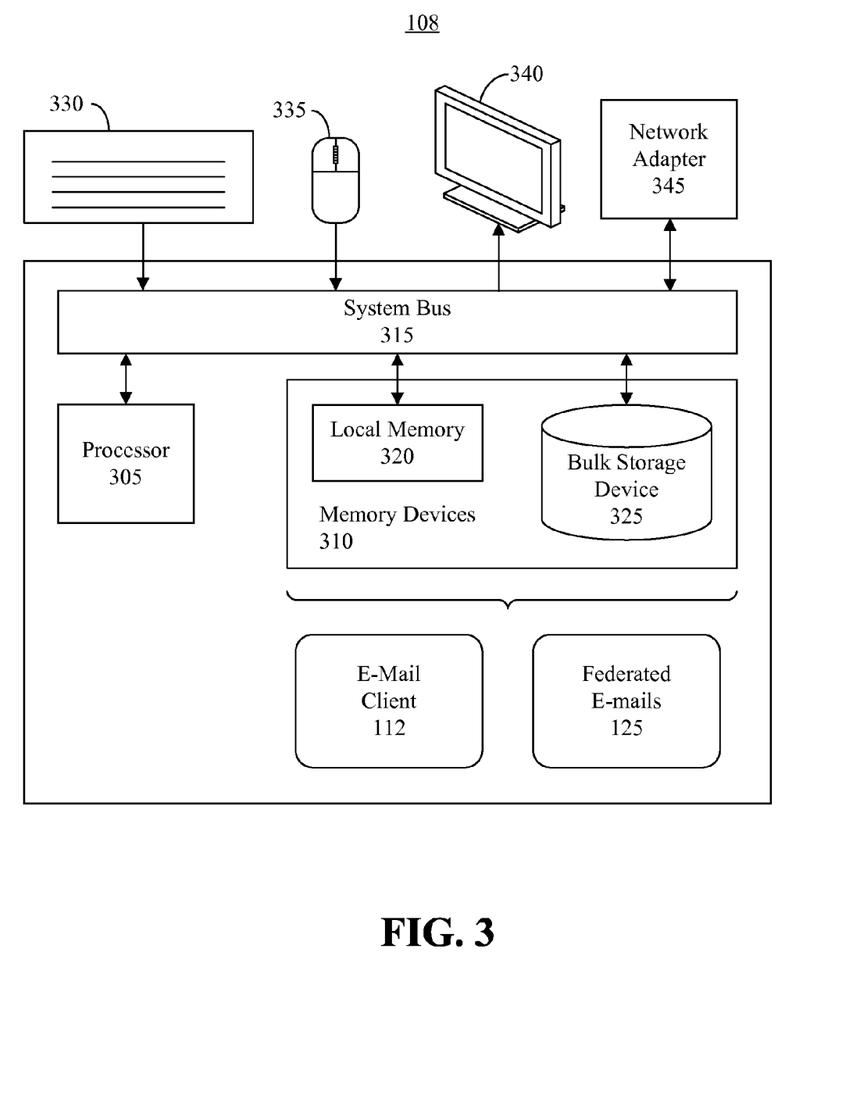
FIG. 3 is a block diagram illustrating a communication device for accessing federated e-mail in accordance with one embodiment of the present invention.

FIG. 3 is a block diagram of a communication device 108 (or a communication device 110) of FIG. 1 that may be used to access federated e-mails in accordance with an embodiment of the present invention. The communication device 108 can include at least one processor 305 coupled to memory devices 310 through a system bus 315. As such, the communication device 108 can store program code within the memory devices 310. The processor 305 can execute the program code accessed from the memory devices 310 via system bus 315 in order to implement the processes and methods described herein that are performed by the communication device 108 (or the communication device 110). In one aspect, for example, the communication device 108 can be implemented as computer that is suitable for storing and/or executing program code. In another aspect, the communication device 108 can be implemented as a mobile computer, a netbook, a personal digital assistant, a mobile telephone, a mobile radio, or an internet device. It should be appreciated, however, that the communication device 108 can be implemented in the form of any system comprising a processor and memory that is capable of performing the functions described within this specification.

The memory devices 310 can include one or more physical memory devices such as, for example, local memory 320 and one or more bulk storage devices 325. Local memory 320 refers to random access memory or other non-persistent memory device(s) generally used during actual execution of the program code. The bulk storage device(s) 325 can be implemented as a hard drive or other persistent data storage device. The communication device 108 also can include one or more cache memories (not shown) that provide temporary storage of at least some program code in order to reduce the number of times program code must be retrieved from the bulk storage device 325 during execution.

Optionally, input/output (I/O) devices such as keyboard or keypad 330, a pointing device 335, and a display 340 also can be coupled to communication device 108. In one embodiment, the display can be a touchscreen. The I/O devices can be coupled to the communication device 108 either directly or through intervening I/O controllers. A network adapter 345 also can be coupled to communication device 108 to enable communication device 108 to communicate with the processing device 104 of FIG. 1, other systems, computer systems, remote printers, and/or remote storage devices through intervening private or public networks. Modems, cable modems, Ethernet cards and transceivers are examples of different types of network adapters that can be used with communication device 108.

As pictured in FIG. 3, the memory devices 310 can store the e-mail client 112 (or e-mail client 114). The e-mail client 112, being implemented in the form of executable program code, can be executed by the communication device 108 for the purposes of viewing federated e-mail 125 in accordance with the methods described herein. The memory devices 310 also can store federated e-mails 125, for example when retrieved from the e-mail server during a synchronization process. As noted, the federated e-mails 125 can be stored into a particular folder in the e-mail client 112.

Figure 4:
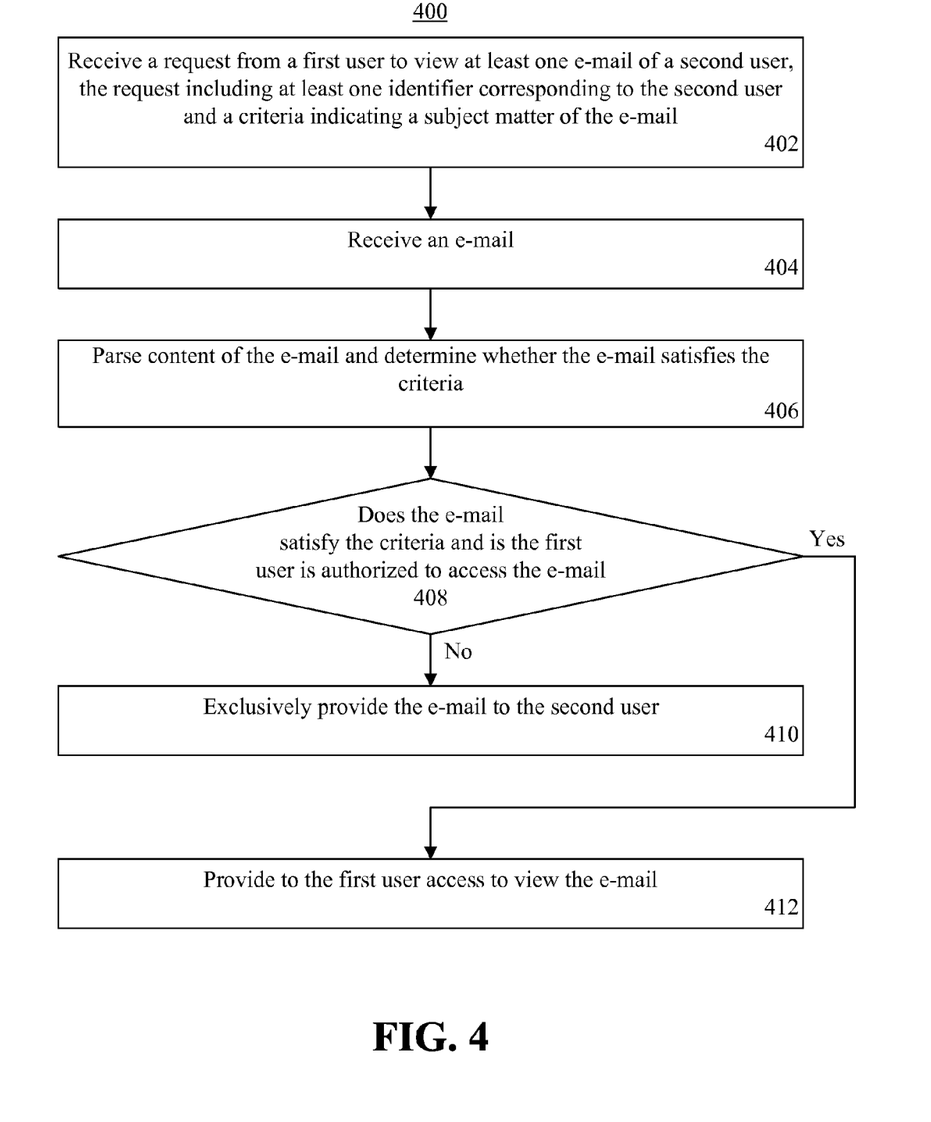
FIG. 4 is a flow chart illustrating a method of federating e-mail in accordance with another embodiment of the present invention.

FIG. 4 is a flow chart illustrating a method 400 of federating e-mail in accordance with another embodiment of the present invention. At step 402, a request from a first user can be received to view at least one e-mail of a second user. The request can include at least one identifier corresponding to the second user and a criteria indicating a subject matter of the e-mail.

At step 404, an e-mail can be received. At step 406, the e-mail can be parsed to determine whether the e-mail satisfies the criteria. For example, the e-mail can be parsed when it is received, or at a later point in time. Referring to decision box 408, a determination can be made as to whether the e-mail satisfies the criteria and whether the first user is authorized to access the e-mail. If not, at step 410 the e-mail can be provided exclusively to the second user.

If, however, a determination is made that the e-mail satisfies the criteria and the first user is authorized to access the e-mail, than at step 412 the first user can be provided access to view the e-mail. In one embodiment, an identifier can be associated with the e-mail to indicate the subject matter of the e-mail. The identifier can be embedded in the e-mail, for example as metadata, such as a meta tag. Further, a first folder in an e-mail client of the first user and/or a first folder in an e-mail client of the second user in which to place the e-mail can be identified. The first folder can be distinct from a second folder in which at least one other e-mail received by the first user is placed. For instance, federated e-mails pertaining to a first subject can be placed in a first folder, and federated e-mails pertaining to a second subject can be placed in a second folder.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. A "user," as used herein, means a person. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. Within a system comprising a processor and a memory, a method of federating electronic mail (e-mail), the method comprising:
    via the processor, receiving a request from a first user to view at least one e-mail of a second user, the request comprising at least one identifier corresponding to the second user and a criteria indicating a subject matter of the e-mail;
    via the processor, receiving the e-mail;
    via the processor, parsing content of the e-mail after receiving the e-mail;
    via the processor, verifying whether the first user is authorized to access the e-mail of the second user that satisfies the criteria,
    wherein verifying whether the first user is authorized to access the e-mail of the second user that satisfies the criteria comprises determining whether any of the parsed content corresponds to the subject matter identified by the criteria; and
    responsive to determining that the first user is authorized to view the e-mail of the second user that satisfies the criteria, via the processor, providing to the first user access to view at least one e-mail that satisfies the criteria,
    wherein providing to the first user access to view the e-mail that satisfies the criteria comprises identifying a first folder in an e-mail client of the first user in which to place the e-mail, the first folder being distinct from a second folder in which at least one other e-mail received by the first user is placed.

2. The method of claim 1, wherein parsing the content of the e-mail comprises:
    parsing the content when the e-mail is received.

3. The method of claim 1, wherein providing to the first user the e-mail that satisfies the criteria comprises:
    associating an identifier with the e-mail that indicates the subject matter of the e-mail.

4. The method of claim 3, wherein associating the identifier with the e-mail comprises:
    embedding the identifier in the e-mail as metadata.

5. The method of claim 1, wherein, providing to the first user access to view the at least one e-mail that satisfies the criteria comprises:
    placing the e-mail in a directory that the first user is authorized to access.

6. A system that federates electronic mail (e-mail), the system comprising:
    a processor that:
    receives a request from a first user to view at least one e-mail of a second user, the request comprising at least one identifier corresponding to the second user and a criteria indicating a subject matter of the e-mail;
    receives the e-mail;
    parses content of the e-mail after receiving the e-mail; and
    verifies whether the first user is authorized to access the e-mail of the second user that satisfies the criteria by determining whether any of the parsed content corresponds to the subject matter identified by the criteria; and
    responsive to determining that the first user is authorized to view the e-mail of the second user that satisfies the criteria, provides to the first user access to view at least one e-mail that satisfies the criteria and identifies a first folder in an e-mail client of the first user in which to place the e-mail, the first folder being distinct from a second folder in which at least one other e-mail received by the first user is placed.

7. The system of claim 6, wherein the processor parses the content when the e-mail is received.

8. The system of claim 6, wherein the processor associates an identifier with the e-mail that indicates the subject matter of the e-mail.

9. The system of claim 8, wherein the processor embeds the identifier in the e-mail as metadata.

10. The system of claim 6, wherein the processor places the e-mail in a directory that the first user is authorized to access.

11. A computer program product comprising:
    a non-transitory computer readable storage medium having stored thereon computer readable program code that, when executed by a system comprising a processor and a memory, federates electronic mail (e-mail), the non-transitory computer readable storage medium comprising:
    computer readable program code that receives a request from a first user to view at least one e-mail of a second user, the request comprising at least one identifier corresponding to the second user and a criteria indicating a subject matter of the e-mail;
    computer readable program code that receives the e-mail;
    computer readable program code that parses content of the e-mail;

computer readable program code that verifies whether the first user is authorized to access the e-mail of the second user that satisfies the criteria, wherein the computer readable program code that verifies whether the first user is authorized to access the e-mail of the second user that satisfies the criteria further comprises computer readable program code that determines whether any of the parsed content corresponds to the subject matter identified by the criteria;

computer readable program code that, responsive to determining that the first user is authorized to view the e-mail of the second user that satisfies the criteria, provides to the first user access to view at least one e-mail that satisfies the criteria by identifying a first folder in an e-mail client of the first user in which to place the e-mail, the first folder being distinct from a second folder in which at least one other e-mail received by the first user is placed.

12. The computer program product of claim 11, wherein the computer readable program code that parses the content of the e-mail comprises: computer readable program code that parses the content when the e-mail is received.

13. The computer program product of claim 11, wherein the computer readable program code that provides to the first user access to view the e-mail that satisfies the criteria comprises:

computer readable program code that associates an identifier with the e-mail that indicates the subject matter of the e-mail.

14. The computer program product of claim 13, wherein the computer readable program code that associates the identifier with the e-mail comprises:

computer readable program code that embeds the identifier in the e-mail as metadata.

15. The computer program product of claim 11, wherein the computer readable program code that provides to the first user access to view at least one e-mail that satisfies the criteria comprises:

computer readable program code that places the e-mail in a directory that the first user is authorized to access.

* * * * *